United States Patent
Sumser et al.

(10) Patent No.: US 6,834,500 B2
(45) Date of Patent: Dec. 28, 2004

(54) TURBINE FOR AN EXHAUST GAS TURBOCHARGER

(76) Inventors: Siegfried Sumser, Buchauer Strasse 3, 70327 Stuttgart (DE); Erwin Schmidt, Goethestrasse 18, 73668 Baltmannsweiler (DE); Stephan Schenkel, Brentenwaldstrasse 23, 70688 Stuttgart (DE)

( * ) Notice: Subject to any disclaimer, the term of this patent is extended or adjusted under 35 U.S.C. 154(b) by 0 days.

(21) Appl. No.: 10/601,134

(22) Filed: Jun. 20, 2003

(65) Prior Publication Data

US 2004/0062638 A1 Apr. 1, 2004

(30) Foreign Application Priority Data

Jun. 22, 2002 (DE) .......................................... 102 28 003

(51) Int. Cl.⁷ .............................. F02B 37/12; F02C 6/12; F02C 9/18; F02C 9/20; F02D 23/00
(52) U.S. Cl. .......................... 60/602; 415/158; 415/191; 417/407
(58) Field of Search .......................... 60/602; 415/157, 415/158, 191, 192, 193, 194, 195; 417/407

(56) References Cited

U.S. PATENT DOCUMENTS

| | | | | |
|---|---|---|---|---|
| 4,776,168 A | * | 10/1988 | Woollenweber | 60/602 |
| 5,758,500 A | * | 6/1998 | Sumser et al. | 60/602 |
| 6,216,459 B1 | * | 4/2001 | Daudel et al. | 60/602 |
| 6,220,031 B1 | * | 4/2001 | Daudel et al. | 60/602 |
| 6,536,214 B2 | * | 3/2003 | Finger et al. | 60/602 |
| 6,648,594 B1 | * | 11/2003 | Horner et al. | 417/407 |
| 6,672,061 B2 | * | 1/2004 | Schmid et al. | 60/602 |
| 6,715,288 B1 | * | 4/2004 | Engels et al. | 60/602 |

FOREIGN PATENT DOCUMENTS

| | | |
|---|---|---|
| DE | 34 27 715 | 12/1985 |
| DE | 39 08 285 | 6/1990 |
| DE | 39 43 399 | 3/1991 |
| DE | 43 40 487 | 1/1995 |
| DE | 196 15 237 | 10/1999 |

* cited by examiner

Primary Examiner—Sheldon J Richter
(74) Attorney, Agent, or Firm—Klaus J. Bach

(57) ABSTRACT

In a turbine for an exhaust gas turbocharger including a turbine wheel with a number of turbine wheel blades supported in a housing, which defines a first radial inlet flow channel and which includes in the radial inlet flow channel a variable guide vane structure for guiding exhaust gas radially onto the turbine wheel, and a second, semi-axial, flow channel for guiding exhaust gas semi-axially to the turbine wheel, the turbine wheel blades are arranged and sized so as to define between circumferentially adjacent blades, a flow passage with a flow cross-section which has a minimum at its inlet end.

7 Claims, 1 Drawing Sheet

TURBINE FOR AN EXHAUST GAS TURBOCHARGER

BACKGROUND OF THE INVENTION

The invention relates to a turbine for an exhaust gas turbocharger including a turbine wheel with a number of turbine blades, a first radially extending inlet flow channel and a second inlet flow channel which extends semi-axially to the turbine wheel and variable flow guide means arranged in the first inlet channel to permit motor braking operation of the internal combustion engine on which the turbocharger is installed.

Such turbines are known for example from DE 34 27 715 C1, DE 39 08 285 C1, DE 43 30 487 C1 or DE 196 15 237 C2. Exhaust gas is admitted to the turbine wheels of these turbines by way of exhaust gas admission channels, which extend radially and also semi-axially wherein the radially extending flow channels are closed during motor braking operation by a variable guide vane structure whereby the turbines are then operated practically as semi-axial turbines. With these so-called turbo-brakes, a substantially increased braking power can be achieved in comparison with the normal suction engines.

Problematic for these turbines and for turbochargers, which include such turbines, is the good efficiency of the turbine under normal operating conditions since the high motor braking power needed results in an excessive speed of the turbine wheel. Such an excessive turbine wheel speed may result in damages to the compressor and the turbine wheel. Therefore, in practice, the variable flow guide structure at the entrance to the radial flow channel is always kept open to a certain degree in order to reduce the pressure in the semi-axial flow channel. In this way, however, the desired theoretically achievable motor braking power cannot be achieved as it is possible with the blowing down of gases or throttling of gases by an additional throttle valve.

However, the above measures generally result in a cost increase of the turbines, in increased space requirements and in a higher risk of failure.

It is therefore the object of the present invention to provide a turbine for an exhaust gas turbocharger, which is simple in design, yet provides for high motor braking power.

SUMMARY OF THE INVENTION

In a turbine for an exhaust gas turbocharger including a turbine wheel with a number of turbine wheel blades supported in a housing, which has a first radial inlet flow channel including a variable guide vane structure for guiding exhaust gas radially onto the turbine wheel, and a second, semi-axial, flow channel for guiding exhaust gas semi-axially to the turbine wheel, the turbine wheel blades are arranged and sized so as to define between circumferentially adjacent blades a flow passage with a flow cross-section which has a minimum at its inlet end.

The cross-section between adjacent turbine blades in the semi-axial inlet channel is designed so as to provide for a minimum flow area at the semi-axial entrance of the second flow channel to the turbine wheel. The flow passage for the in-flowing exhaust gases is so narrow that, at a certain relatively high turbine wheel speed, preferably near the limit speed or slightly below that speed, the gas flow is blocked. This is achieved as the incoming exhaust gas flow reaches the speed of sound in the narrowest cross-section. A further increase of the turbine wheel speed is then no longer possible. As a result, the operating efficiency of the turbine becomes lower whereby, on one hand, the turbine speed is not further increased and, on the other hand, a higher braking power with a higher energy flux is achieved.

However, the design of the turbine wheel in accordance with the invention does not detrimentally affect the normal operation of the turbine wherein the engine power output is increased since under normal operation the exhaust gas pressure is substantially lower so that the above-mentioned blocking conditions will generally not occur.

It is noted in this connection that, with the circumferential speed of the turbine wheel, the effective angle of attack to the turbine wheel changes. Consequently, the effective inlet flow cross-section to the turbine wheel is speed-dependent. At high turbine wheel speeds, the effective inlet cross-section is substantially reduced so that the blocking conditions referred to above become earlier effective.

With regard to the desired deterioration of the efficiency, it is particularly advantageous if the open flow cross-section between two blades of the turbine wheel in the inlet area of the second flow channel is smaller than the outlet cross-section between the wheel blades of the turbine wheel In practice, particular good conditions exist when, in the semi-axial inlet area of the second flow channel, the inlet cross-section between two adjacent blades of the turbine wheel is less than three times the exit cross-section between two adjacent guide vanes. It is furthermore advantageous if the inlet cross-section between two adjacent turbine wheel blades at the semi-axial inlet of the second flow channel is equal to, or larger than, the outlet cross-section between two adjacent guide vanes of the guide vane structure.

Advantageous embodiments of the invention will become more readily apparent from the following description on the basis of the accompanying drawings.

DESCRIPTION OF A PREFERRED EMBODIMENT

Figure 1:
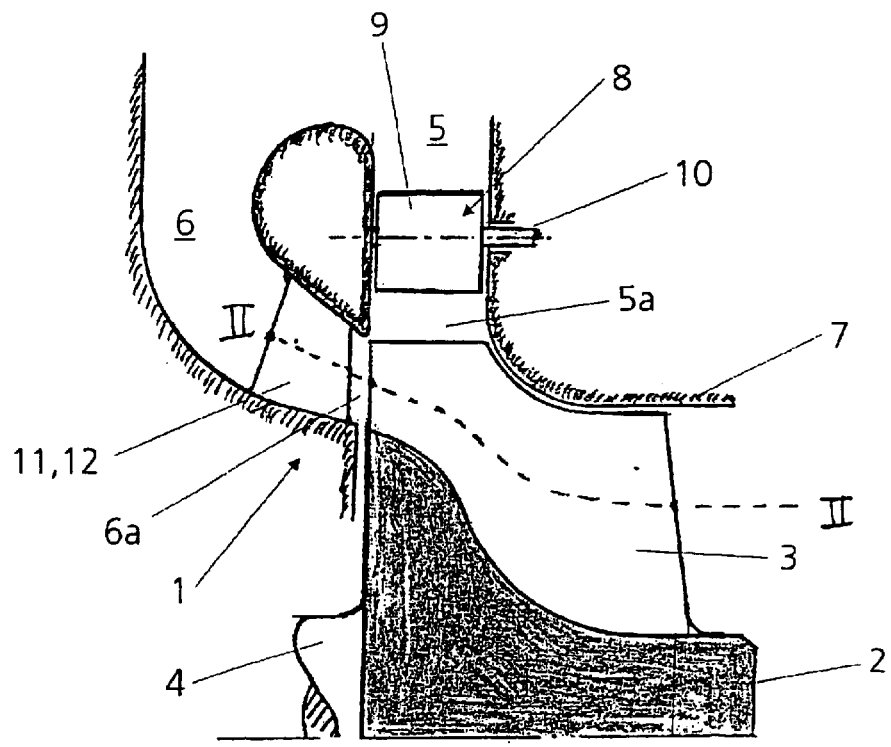
FIG. 1 is a sectional side view of the turbine according to the invention.

FIG. 1 shows a turbine 1 for an exhaust gas turbocharger, which is not fully shown, for an internal combustion engine, which is also not shown. The turbine 1 includes a turbine wheel 2, which is preferably cast and includes several turbine wheel blades 3. It is rotatably supported by a shaft 4, which carries also a compressor (not shown) driven by the turbine 1 of the exhaust gas turbocharger.

The turbine 1 includes, in a well-known manner, a first inlet flow channel 5, which extends radially and has a radial inlet 5a, and a second inlet flow channel 6 which extends semi-axially and has a semi-axial inlet 6a, both formed in the housing 7 of the turbine 1. At the inlet 5a of the first channel 5 to the turbine wheel 2, a variable guide vane structure 8 is arranged which, in this case, includes several adjustable guide vanes 9 pivotally supported by a shafts 10. Instead of pivotally supported guide vanes 9, the guide vane structure 8 could be an axially movable guide vane slide member.

Similarly, a guide vane structure 11 is arranged at the inlet 6a of the second flow channel 6 to the turbine wheel 2. The guide vane structure 11 may include stationary vanes 12. The effect and purpose of guide vanes for influencing the gas flow to a turbine wheel is well-known.

Figure 2:
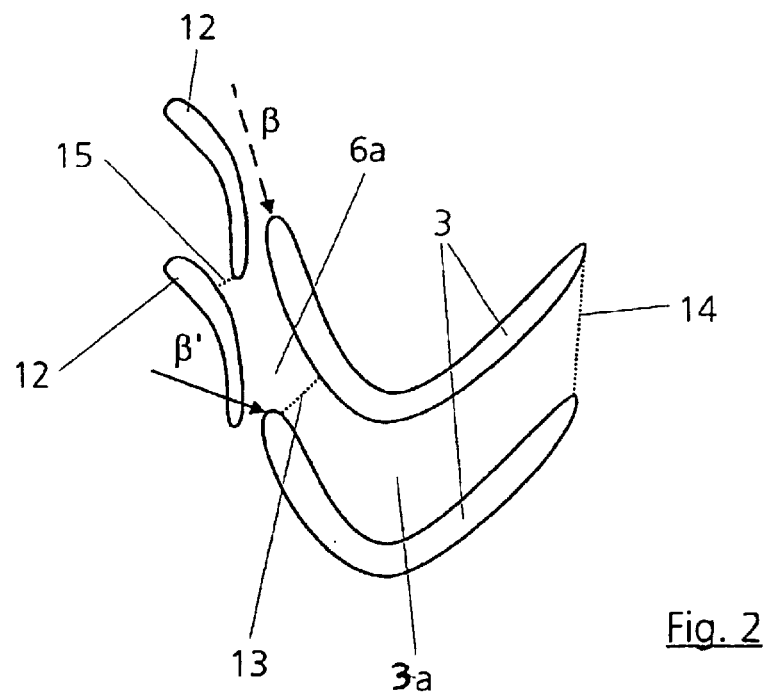
FIG. 2 is a sectional view taken along line II—II of FIG. 1.

In order to initiate with the turbine 1 motor braking operation of the associated internal combustion engine, the guide vane structure 8 is closed so that exhaust gas is admitted to the turbine wheel 2 only by way of second inlet flow channel 6 and the turbine is operated essentially as a semi-axial flow turbine. Since with motor braking power requirements the speed of the turbine wheel 2 may become excessive, the turbine blades 3 are designed and arranged in a special way which will be explained below on the basis of the schematic representation of FIG. 2.

The open flow cross-section 13 of the flow passage between two adjacent turbine blades 3 at the entrance 6a in the second flow channel 6 will be called the entrance cross-section 13. It is-in contrast to the common turbine wheel design smaller than the exit cross-section 14 of the flow passage between the same two adjacent turbine blades 3 of the turbine wheel 2. In fact, the entrance cross-section 13 is smaller than the cross-section of the flow passage between the two adjacent turbine blades 3 is at any point over the length of the flow passage; that is the flow passage cross-section has a minimum at the entrance 6a. Because of the "bottle neck" formed thereby, the exhaust gases flowing through the guide vane structure 11 to the turbine wheel 2 reach the critical sonic speed already at an early point whereby the entrance cross-section 13 will be blocked and will not permit the passage of a further increased flow volume. The blockage results in a deterioration of the efficiency of the turbine 1 when the maximum permissible speed of the turbine wheel 2 is reached and limits the highest motor braking power sustained by the exhaust gas turbocharger. An excessive speed of the turbine wheel 2 and possible damages resulting therefrom are therefore automatically prevented.

With the deterioration of the efficiency of the turbine 1, the speed of the turbine wheel 2 may even become somewhat lower when a high motor braking power is called for because the compressor needs to be driven by the turbine 1.

It is noted in this connection that the theoretical angle of attack of the exhaust gas admitted through the second inlet flow channel 6 to the turbine wheel 2 is changed with the speed of the turbine wheel. That is, as the speed of the turbine wheel 2 increases, the angle of attack at the entrance 6a to the flow passage through the turbine wheel 2 changes from the angle β indicated by the dashed arrow to the angle β' indicated by a full line arrow. As a result, also the entrance cross-section 13 to the turbine wheel 2 changes dependent on the speed of the turbine wheel. In the shown arrangement, the effective entrance flow cross-section 13 becomes smaller with increasing speed of the turbine wheel 2. At a certain speed, it becomes even smaller than the exit cross-section 15 between the guide vanes 12 of the guide vane structure 11, which, because of its stationary design, remains unchanged. During normal operation of the turbine 1 the entrance cross-section 13 is effective as a diffuser which detrimentally affects the efficiency of the turbine 1 and in the range, in which blocking occurs, it acts as a Laval nozzle.

As the exhaust gas enters the turbine wheel flow passages 3a at the angle of attack β' (at high turbine wheel speed), the flow is subjected to a relatively high back pressure which provides for the blocking of the flow described earlier and the corresponding efficiency deterioration in the turbine 1.

The following dimensions for the individual cross-sections relative to one another have been found to be particularly suitable in practice. However, in special cases, deviations from these rules are of course possible.

The entrance cross-section 13 between two adjacent blades 3 of the turbine wheel 2 at the entrance 6a of the second inlet flow channel 6 is less than three times the exit cross-section 15 between two adjacent guide vanes 12 of the guide vane structure 11. In the turbine shown which is for an internal combustion engine with a piston displacement of about 12 liter and an engine power output of about 450 kW, the exit cross-section 15 between two adjacent guide vanes 12 is for example 180 mm$^2$. The real entrance cross-section 13 may be for example about 400 mm, but, at a correspondingly high speed of the turbine wheel 2, the actual entrance flow cross-section becomes only 150 to 200 mm$^2$.

When the entrance cross-section 13 at the turbine wheel 2 is equal to, or larger than, the exit cross-section 15 of the guide vane structure 11 the gas mass flow capacity of the turbine 1, with the adjustable guide vane structure 8 in the radial first inlet channel 5 closed, is highly dependent on the turbine speed.

The exit cross-section 15 of the guide vane structure 11 in the semi-axial inlet channel 6 is about ½₀–⅕ of the exit flow cross-section 14 of the turbine wheel 2, which in the present case may be larger than 1000 mm$^2$.

What is claimed is:

1. A turbine for an exhaust gas turbocharger, including a turbine wheel with a number of turbine wheel blades supported in a housing defining a first radial inlet flow channel, a variable guide vane structure arranged in said first inlet flow channel for guiding exhaust gas radially onto said turbine wheel, a second inlet flow channel which extends semi-axially to said turbine wheel for guiding exhaust gas to said turbine wheel in a semi-axial flow direction, said turbine wheel blades being arranged so as to define between circumferentially adjacent blades at the semi-axial second inlet flow channel a flow cross-section which has a minimum at its inlet end, with the entrance cross-section between two adjacent blades of said turbine wheel at the entrance from the second inlet flow channel being less than three times the exit cross-section between two adjacent guide vanes.

2. A turbine according to claim 1, wherein the entrance cross-section between two adjacent turbine wheel blades at the semi-axial entrance from the second flow channel is at least as large as the exit cross-section of the flow passage between two adjacent guide vanes of the guide vane structure.

3. A turbine according to claim 1, wherein said guide vane structure in said first radial inlet flow guide channel are adjustable guide vanes.

4. An exhaust gas turbocharger with a compressor and a turbine according to claim 1.

5. An internal combustion engine with an exhaust gas turbocharger according to claim 1.

6. A turbine according to claim 1, wherein a guide vane structure with guide vanes is disposed in the semi-axial flow channel adjacent to said turbine wheel.

7. A turbine according to claim 6, wherein said guide vanes in said semi-axial flow channel are stationary guide vanes.

* * * * *